United States Patent [19]

Engdahl et al.

[11] 4,012,636
[45] Mar. 15, 1977

[54] SCANNING GAMMA CAMERA

[75] Inventors: Lawrence W. Engdahl, Foxboro, Mass.; John F. Batter, Jr., Rochester, N.Y.; Karl J. Stout, Hudson, Mass.

[73] Assignee: Raytheon Company, Lexington, Mass. ; a part interest

[22] Filed: Sept. 8, 1975

[21] Appl. No.: 611,045

[52] U.S. Cl. .......................................... 250/363 S
[51] Int. Cl.² ........................................ G01T 1/20
[58] Field of Search ............... 250/363 S, 446, 447, 250/448, 449

[56] References Cited
UNITED STATES PATENTS

| | | |
|---|---|---|
| 2,822,477 | 2/1958 | Kizaur ............................ 250/447 |
| 3,784,819 | 1/1974 | Martone et al. ................ 250/363 S |
| 3,852,601 | 12/1974 | Casale ........................ 250/363 S X |

*Primary Examiner*—Davis L. Willis
*Attorney, Agent, or Firm*—David M. Warren; Joseph D. Pannone; Milton D. Bartlett

[57] ABSTRACT

A scanning system for a gamma camera providing for the overlapping of adjacent scan paths. A collimator mask having tapered edges provides for a graduated reduction in intensity of radiation received by a detector thereof, the reduction in intensity being graduated in a direction normal to the scanning path to provide a blending of images of adjacent scan paths.

31 Claims, 15 Drawing Figures

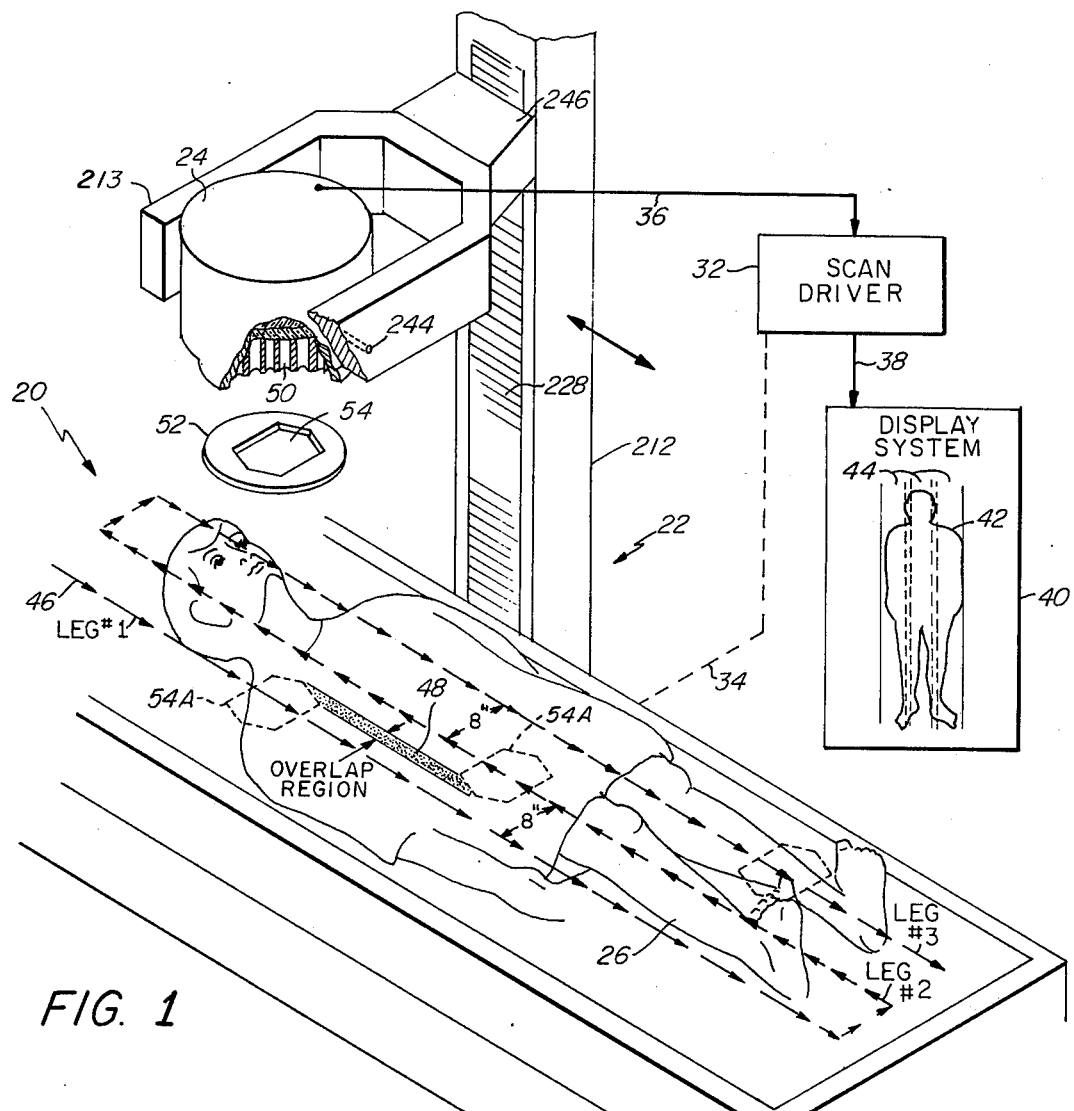
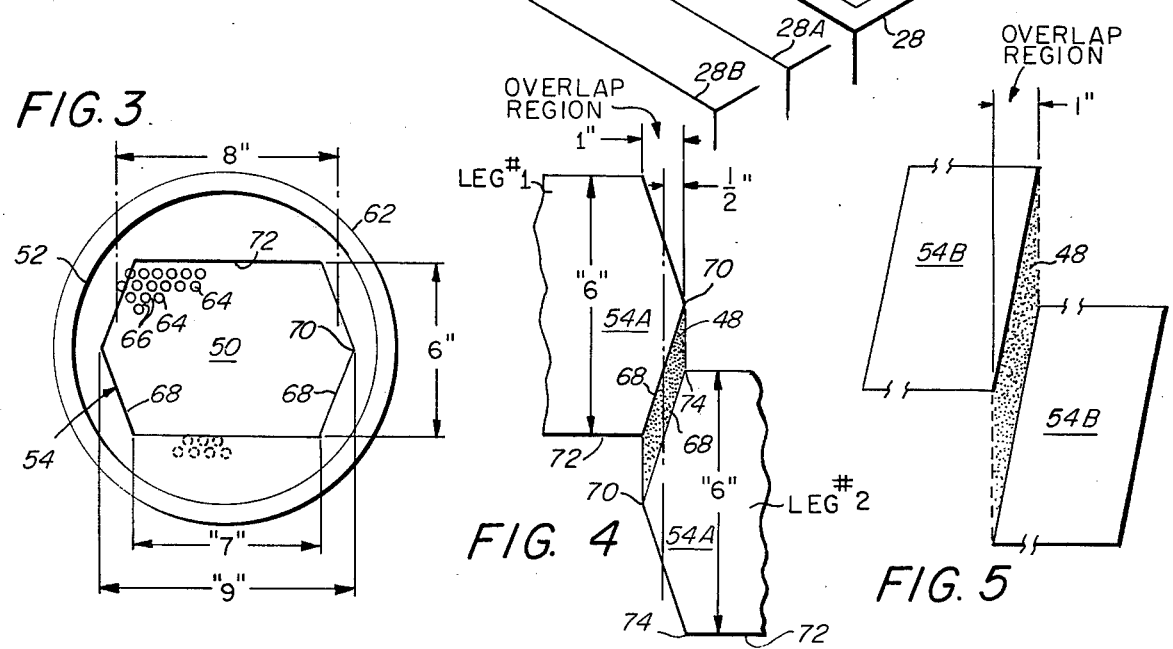

SCANNING GAMMA CAMERA

BACKGROUND OF THE INVENTION

Cameras used in radiographic imaging, such as the Anger camera, are manufactured in various sizes for providing images of subject matter of varying sizes. To date, no such camera is sufficiently large to form an image of a complete adult human subject and, accordingly, devices have been built for moving such cameras along a predetermined path for scanning over a large subject, successive ones of the scan paths covering successive portions of the subject with images corresponding to the successive scan paths being positioned adjacent each other to form a composite image of the subject.

A problem occurs in such scanning systems at the boundary lines between the images corresponding to the successive scan paths. If successive passes or scans of the camera over the subject are too close together, a portion of the subject at the edge of a scan path is photographed twice and appears twice, once in each of the images corresponding to two adjacent scan paths. One method of treating this problem in the prior art has been to separate the adjacent scan paths a sufficient distance to ensure that the camera will not twice photograph the same portion of the subject during a scanning along two adjacent paths. However, this procedure has not been satisfactory because of a resulting seam which is apparent in the resulting image, this seam appearing between the partial images corresponding to the adjacent scan paths.

SUMMARY OF THE INVENTION

The aforementioned problems are overcome and other advantages are provided by a camera-scanning system which, in accordance with the invention, introduces a relative motion between the camera and the subject whereby the camera makes a plurality of passes over the subject along adjacent, slightly overlapping, paths for producing an image of the complete subject. A collimator carried by the camera for guiding rays of high energy radiation, such as X and gamma radiation, from the subject to a radiation detector within the camera is masked to admit radiant energy through an aperture having a shape which provides for a graduated change in intensity of received radiation in the vicinity of the edge of a scan path. This provides a blending of the images in the overlapping interface between adjacent paths. More specifically, the edge of the aperture lying above the boundary line of adjacent scan paths is angled with respect to that boundary line. In one embodiment of the invention the side of the masked aperture facing the boundary line between adjacent scan paths is bowed to give the aperture the form of a stretched-out hexagon while, in a second embodiment of the invention, these aperture sides are angled to give an aperture shape in the form of a parallelogram. Thereby, the intensity of received radiation is gradually reduced or tapered in a direction normal to the scanning path to provide the desired blending and the resultant uniform image of the complete subject.

This scanning system is particularly useful for obtaining radiographic images of an adult human subject. In the preferred embodiment of the invention, the scan has the format of parallel scan paths. The camera is moved lengthwise along the subject by an electrical drive responsive to a scanning signal, and the subject is supported by a bed which is moved transversely in the indexing direction by an electrical drive responsive to an indexing signal. Since it is sometimes desirable to have the subject inclined during the imaging procedure, a support mechanism is provided for raising and lowering one end of a bed supporting the subject relative to the other end of the bed. Also, there is disclosed a camera drive which may be operated during the scanning for elevating and lowering the camera when the subject is inclined to maintain a specified distance from the subject.

In one embodiment of the invention the image is displayed by means of a cathode ray tube in which the Z axis is modulated with the intensity of signals received by the camera and the X and Y signals are provided by summing together the X camera output with the scan indexing signal and the Y camera output with the scanning signal. In this way, the images received by the camera are positioned on the cathode ray tube in accordance with the relative position between the camera and the subject.

In an alternative embodiment of the invention the three camera output signals are connected respectively to the three input terminals of a cathode ray tube or oscilloscope which is spaced apart from and faces a photographic plate. A scanning lens is positioned between the cathode ray tube and the photographic plate for focusing an image of the cathode ray tube on the photographic plate. A mechanism is provided for scanning the lens in the identical format to the scanning of the camera so that an image is built up by successive scan paths on the photographic plate identical to the form of the subject.

BRIEF DESCRIPTION OF THE DRAWINGS

The aforementioned features and other aspects of the invention are explained in the following description taken in connection with the accompanying drawings wherein:

FIG. 1 is a stylized pictorial view of a scanning camera system in accordance with the invention showing the overlapping edges of adjacent scan paths to provide a tapered blending of the images of the adjacent scan paths;

FIG. 3 is an end view of the camera of FIG. 2 taken along the lines 3—3 showing a collimator mask having an aperture with a tapered edge in accordance with the invention;

FIG. 4 is an enlarged view of an overlapping region of successive scan paths of FIG. 1 showing the blending of the images of the successive line paths at their interface, this blending being accomplished by the tapered edges of the mask aperture;

FIG. 5 is a view of a mask aperture having the alternative form of a parallelogram;

DESCRIPTION OF THE PREFERRED EMBODIMENTS

Figure 9:
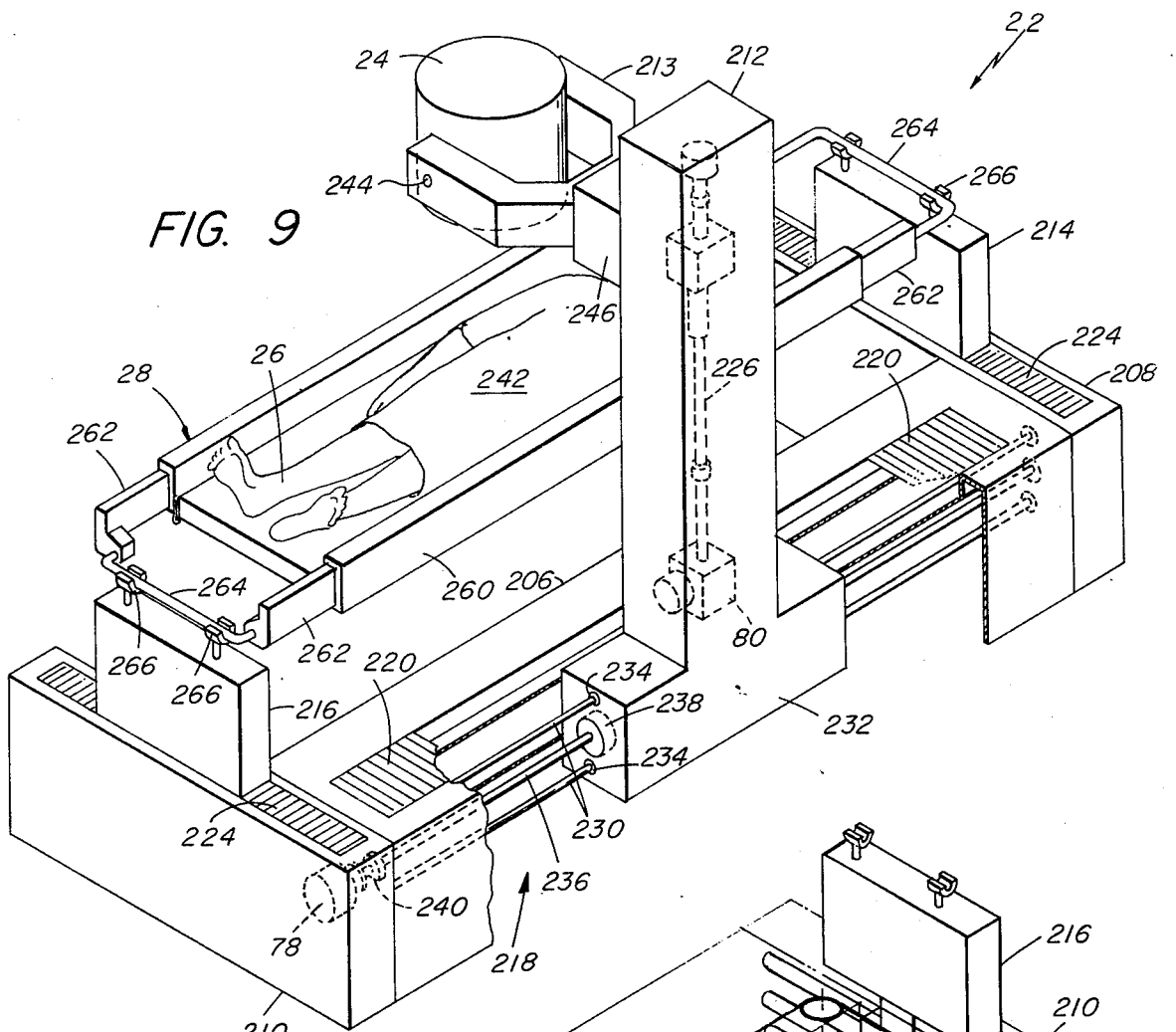
FIG. 9 is an isometric view of the scanning mechanism which supports the subject and imparts a relative motion between the subject and the camera, the figure being partially broken away at the rear portion thereof to show the scanning mechanism for moving the camera in the Y or scan direction.

Referring now to FIGS. 1 and 9, there is shown a radiographic scanning system 20 which comprises, in accordance with the invention, a scanner 22 which imparts a relative motion between a camera 24 and a subject 26 supported by a bed 28. Two additional edges of the bed identified by the legends 28A and 28B are shown in phantom for designating three positions of the bed corresponding to three separate scan paths. The camera 24 is supported and driven by the scanner 22 which moves the camera in a longitudinal direction over the subject, this direction being referred to as the scan direction or the Y direction. The X direction or indexing direction of the scanning operation is performed by moving the bed 28 in a direction normal to the scanning direction, one indexing motion being provided between each of the scanning movements of the camera 24.

In FIG. 1 a scan driver 32 is shown mechanically coupled by a dashed line 34 to the scanner 22 for imparting the X and Y scanning motions between the camera 24 and the subject 26. The scan driver 32 couples electrical signals from the camera 24 via cable 36 and, in a first embodiment of the invention, combines the signals with other signals representing the relative position of the camera 24 to the subject 26, these combined signals being transmitted via cable 38 to a display system 40. In a first embodiment of the invention, the display system 40 comprises a cathode ray tube having a long persistance phosphor for viewing by an operator of the system 20, the image 42 of the subject 26 being gradually formed as the camera 24 scans back and forth over the subject 26. FIG. 1 shows successive scan paths 44 of the image 42 corresponding to the portions of the path 46 indicated by arrows overlaying the subject 26, the path 46 being the path of travel of the camera 24 over the subject 26. The scan paths 44 are seen to overlap slightly, this same overlap region being indicated with reference to the subject 26 by the overlap area 48 superimposed upon the subject 26.

The camera 24 is shown partially cut away to disclose a collimator 50, and is furthermore shown in exploded view to disclose the form of a mask 52 which blocks off rays of radiation propagating from the subject 26 to the collimator 50. Typically, the subject 26 ingests a radioactive material producing gamma radiation, and the mask 52 is, accordingly, fabricated from a material such as lead which can block the gamma rays. It is noted that the end portions of the mask aperture 54 are tapered or bowed to provide a graduated variation of intensity of radiation received by the collimator at the edge of each scan path. The overlap area 48 is shown drawn between two projected regions of the mask aperture 54 to indicate the extent of overlap between the end portion of an aperture traveling along one path and the end portion of the aperture traveling along the next leg of the path 46.

Figure 2:
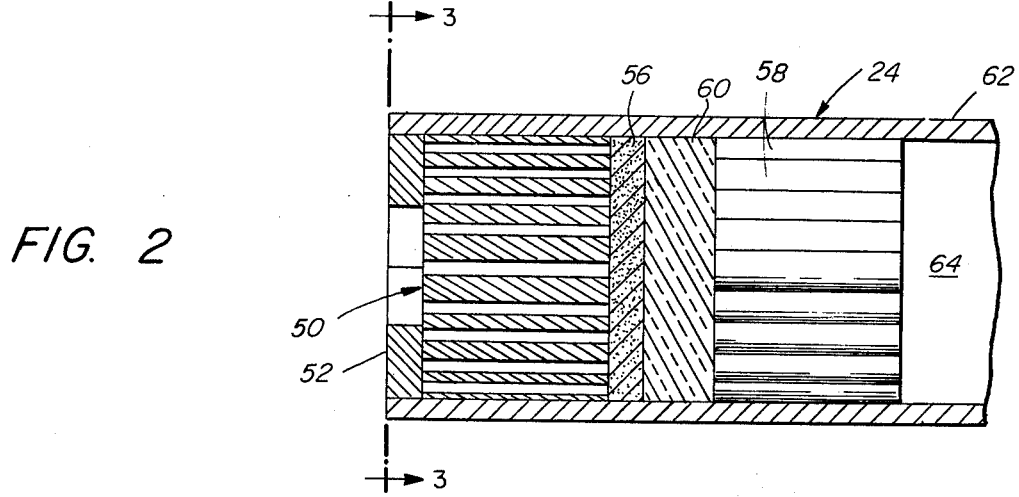
FIG. 2 is an axial sectional view of the camera of FIG. 1.

Referring now to FIG. 2, there is shown a sectional view of the camera 24 which is seen to comprise the mask 52 and the collimator 50, previously seen in FIG. 1, a scintillator 56 typically fabricated of a crystalline material such as sodium iodide which emits optical photons in response to incident gamma ray photons, an array of photomultiplier tubes 58 and a light pipe 60 of an optically transparent material for conducting light from the scintillator 56 to the front faces of the photomultipliers 58. A camera of this form but without the mask 52 has been disclosed in a copending United States patent application for a Gamma Camera filed by Karl J. Stout on Nov. 21, 1973, and having Ser. No. 418,157, now U.S. Pat. No. 3,914,611 issued Oct. 21, 1975. A case 62 supports the mask 52, the collimator 50, the scintillator 56, the light pipe 60 and the photomultipliers 58 in their respective positions, the case 62 extending beyond the photomultipliers 58 to provide a space 64 suitable for the storage of electronic components utilized in amplifying the signals from the photomultipliers 58 and in combining the signals to provide the X and Y components of the light flashes appearing upon the scintillator 56.

FIG. 3 shows the front face of the camera 24 wherein is seen the case 62 and the mask 52 with its aperture 54 disclosing the front face of collimator 50. The collimator 50 is seen to have tubular passageways 64 separated by septa 66 of a material such as lead which is opaque to the gamma radiation. As seen in both FIGS. 1 and 3, the aperture 54 is seen to have a mean width of eight inches which is equal to the spacing between the successive legs of the scanning path 46. The long sides of the aperture 54 are seen to have a length of seven inches and are spaced apart a distance of 6 inches. The overall length of the aperture 54 is nine inches. The bowed ends 68 of the aperture 54 have their apexes 70 extending one inch beyond the ends of the long sides 72. This one inch extension provides the overlap region 48 of FIG. 1 and is more clearly seen in FIG. 4.

Referring now to FIG. 4, there is seen an enlarged view of the overlap region 48 of FIG. 1 with the projections 54A of two apertures 54 upon the subject 26 of FIG. 1 delineating the overlap region 48. The bowed side 68 is seen to extend across the region 48 with the apexes 70 designating the extreme edges of the region 48. The aperture 54 in its position on the first leg of the path 46 is seen to admit a maximum intensity of radiation up to the overlap region 48 at which point the admitted radiation gradually decreases until the apex 70 at which point the admitted radiation drops to zero. Similarly, the aperture 54 in its position on the second leg of the path 46 begins to admit radiation at its apex 70, its apex 70 lying within the first leg of the path 46, and then gradually admits increasing amounts of radiation until the points 74 at the ends of the long sides 72 are reached, the points 74 lying within the second leg of the path 46. Thus, the bowed ends of the apertures 54 provide gradually decreasing amounts of received radiant energy as one compares the amounts of radiation from sources of radiation lying within one leg of the scanning path 46 to the amounts of radiation received from sources of radiaton lying within the overlap region 48 to the amounts of radiation received from sources within the adjacent leg of the scan path 46.

Referring now to FIG. 5, there are seen the projected regions 54B upon the subject 26 of FIG. 1 produced by an alternative mask of the camera 24 having an aperture with the shape of a parallelogram. The ends of the projected apertures 54B are inclined relative to the edge of the path 46 to provide an overlap region 48A identical to the overlap region 48 of FIG. 4.

By way of alternative embodiments, it is noted that the collimator 50 of FIGS. 1, 2 and 3 may, alternatively, be fashioned by deleting the passageways 64 in the area of the collimator which is covered by the mask 52; in such an embodiment the mask 52 need not be utilized. It is also noted that while, conceptually, such a masking could be accomplished electronically with the use of a standard collimator and without a mask by comparing the values of the X and Y components of each incident gamma ray to the locaton of the masked region, and then either admitting or attenuating the corresponding camera output signal depending on whether the incident gamma ray is located within the transmissive or opaque portion of the mask. However, such an electronic system is more cumbersome than the mask disclosed herein and is, furthermore, limited as to the rate of radiation activity which can be processed due to the relatively lengthy computation time required in determining whether or not a signal received from the camera is within or without the masked region.

Figure 6:
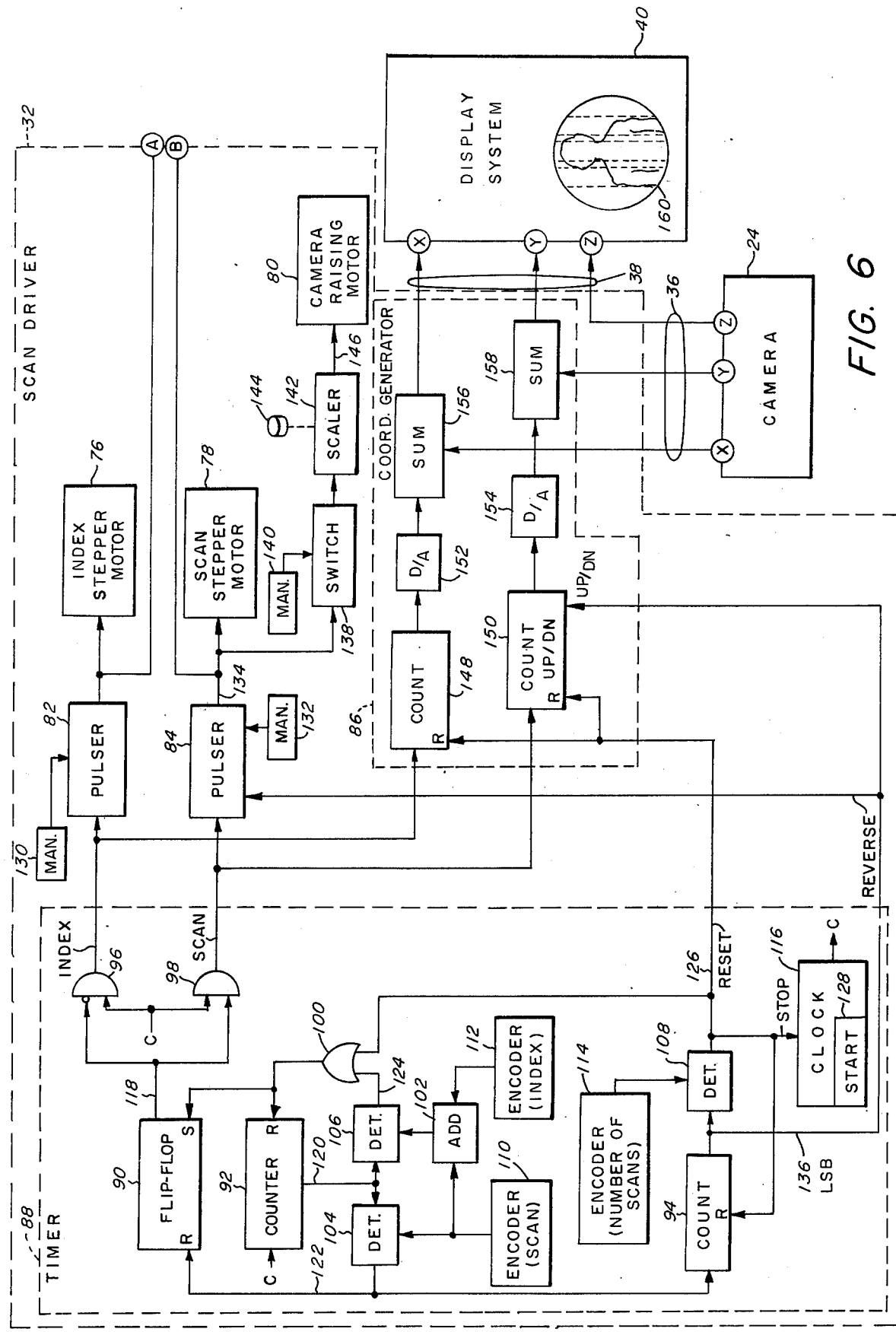
FIG. 6 is a block diagram of the scan driver of FIG. 1 showing electrical timing circuitry and the generation of signals for driving the scanning motors and the signals for positioning the images in a display system of FIG. 1.

Referring now to FIG. 6, there is seen a block diagram of the scan drive 32 with the interconnections via cables 36 and 38 respectively to the camera 24 and the display system 40. The scan driver 32 comprises three stepper motors 76, 78 and 80 respectively for moving the bed 28 of FIG. 1 in the index direction, for moving the camera 24 in the scanning direction and for raising and lowering the camera 24, two pulsers 82 and 84 for driving the index motor 76 and the scan motor 78, a coordinate generator 86 for providing the X and the Y deflection signals for the display system 40 and a timer 88 for generating the signals for driving the pulsers 82 and 84 and the coordinate generator 86 in accordance with the scan path 46 of FIG. 1.

The timer 88 comprises a bistable multivibrator or flip flop 90, two counters 92 and 94, two AND gates 96 and 98, an OR gate 100, an adder 102, three detectors of digital numbers 104, 106 and 108, three digital encoders 110, 112 and 114, and a clock 116. Pulses from the clock, indicated by the letter C, are applied via the AND engaged 96 and 98 respectively to the pulsers 82 and 84. The output of the flip flop 90 on line 118 is applied to a complemented input terminal of the AND gate 96 and to an input terminal of the AND gate 98 for alternately energizing the AND gates 96 and 98 so that clock pulses coupled via these gates are applied either to the pulser 82 or to the pulser 84. The flip flop 90 is initially in a SET condition at the beginning of the scanning sequence so that a logic state of 1 is present on line 18 with the result that, initially, block pulses are applied via the AND gate 98 to the pulser 84 for operating the scan motor 78. Subsequently during the scanning operation, the flip flop 90 is reset with the result that a logic state of 0 appears on line 18 with the result that block pulses are applied via the AND gate 96 to the pulser 82 for operating the index motor 76 while the scan motor 78 remains motionless.

The counter 92 counts pulses provided by the clock 116 and, in response thereto, provides digital numbers on line 120 representing this count. The encoder 110 is manually set by an operator of the scanner 22 of FIG. 1 to provide a digital number representing the length of a leg of the scan path 46 to FIG. 1. Similarly, the encoder 112 is manually operated to provide a digital number representing the length of the indexing motion, shown in FIG. 1 as eight inches. The foregoing value of eight inches may vary slightly, for example, one-eighth inch, if desired, to compensate for spreading in the beam of rays seen by the collimator 50 to more precisely control the overlap region 48. The detector 104 compares the digital number appearing on line 120 with the digital number provided by the encoder 110 to provide a signal on line 122 when it detects an equality of these two numbers. Similarly, the detector 106 compares the digital number on line 120 with the sum of the digital numbers provided by the encoders 110 and 112, this sum being provided by the adder 102. The detector 106 provides a signal on line 124 indicating an equality of these numbers. Thus, it is seen that the signal on line 122 represents the time of completion of one leg of the scan path 46 and the beginning of an indexing of the bed 28 of FIG. 1. The signal on line 124 indicates the termination of an indexing of the bed 28 and the inception of the next leg of the scan path 46.

The encoder 114 is manually set to provide a digital number representing the number of legs of the scan path 46 of FIG. 1. This number may be either 1, 2, or 3, three legs providing a complete image of the human subject 26 of FIG. 1. The counter 94 counts the occurrences of the signal on line 122 and thereby counts the number of completed legs of the scan path 46. The output count of the counter 94 is applied to the detector 108 which provides a signal on line 126 when it detects an equality of the number of counts which the number provided by the encoder 114.

In operation, therefore, the time 88 initiates the scan when the operator pushes the start switch 128 on the clock 116. Clock pulses are then applied via the AND gate 98 to operate the scan motor 78 for moving the camera 24 along the first leg of the path 46. The counter 92 counts the clock pulses and, when the number of clock pulses equals the amount required for the completion of one leg of the scan path 46, the detector 104 signals the completion of the first leg of the scan by transmitting a signal on line 122 to reset the flip flop 90. Thereupon, clock pulses are applied via the AND gate 96 to the index motor 76. The counter 92 continues counting clock pulses and, when the count of these clock pulses shows a completion of the indexing between the first and second legs of the scan, the detector 106 signals the completion of the indexing by transmitting a signal on line 124 via the OR gate 100 to reset the counter 92 and to set the flip flop 90. Thereupon, the scan motor 78 is again operated and the counter 92 begins the count the duration of the second leg of the path 46. The count of the counter 92 signifies the end of the second leg and, with the detector 104, resets the flip flop 90 to initiate the indexing between the second and third legs of the scan path 46. At the conclusion of the second indexing, the detector 106 again resets the counter 92 and sets the flip flop 90 whereupon the scanning of the third leg of the path 46 is initiated. At the conclusion of the scanning of the third leg, the counter 94, which has been counting the signals on line 122, and the detector 108 provide a signal on line 126 which is applied via the OR gate 100 to reset the counter 92 and to set the flip flop 90, the signal on lines 126 also resetting the counter 94 and stopping the clock 116, thereby terminating the scan.

The pulsers 82 and 84 each provide an electric pulse of sufficient power to drive the respective stepper motors 76 and 78 in response to each clock pulse passed by the AND gates 96 and 98. In addition, each pulser 82 and 84 contains internal oscillator which is activated respectively by the manual controls 130 and 132 for manually operating the motors 76 and 78 independently of the timer 88 to position the camera 24 and the bed 28 for the starting position of the scan. In addition, the pulser 84 provides signals along its output cable 134 to selectively operate the scan motor 78 in a forward or reverse direction of rotation, the selection by the pulser 84 being accomplished in response to a signal on line 136 from the counter 94. As was previously explained, the output of the counter 94 is a digital number representing the number of completed legs of the scan path 46 of FIG. 1. Thus, the least significant bit of the digital number at the output of the counter 94 varies alternately from a logic 0 to a logic 1; this least significant bit is transmitted via the line 136 to the pulser 84 wherein the logic 0 or logic 1 results in a driving of the scan motor 78 in either the forward or reverse direction of rotation. In this way, the camera 24 is made to scan alternately from left to right and from right to left along the successive legs of the scan path 46 as viewed in FIG. 1. The output signals of the pulsers 82 and 84 are also made available respectively at the terminals A and B for use in an alternative embodiment of the display system 40 as will be described with reference to FIGS. 7 and 8.

The scan driver 32 further comprises a switch 138, a manual control 140, a scaler 142 and a knob 144 connected thereto for energizing the camera raising motor 80. The switch 138 couples drive signals to the motor 80 from either the pulser 84 via line 134 or, alternatively, from the manual control 140. Coupling of the motor 80 to the line 134 by the switch 138 permits the motor 80 to be operated simultaneously with the operation of the scan motor 78, the rotation direction of the motor 80 reversing upon the reversal of the rotation direction of the scan motor 78. Since the motor 80 is a stepping motor, it increments its rotation in response to each pulse arriving on line 146. This permits the camera 24 to scan in an inclined plane, for example, to maintain a fixed distance from the subject 26 while obtaining an anterior view thereof. It is noted that the depth of a human being lying prostrate on the bed 28 varies from a minimum value at his toes to a maximum value at his chest, so that the plane of the anterior surface is inclined relative to the bed 28.

The coordinate converter comprises two counters 148 and 150, two digital-to-analog converters hereinafter referred to as D/A's 152 and 154 and two summers 156 and 158. The coordinate generator 86 provides the X coordinate and the Y coordinate of the image on the cathode ray tube hereinafter referred to as CRT 160 of the display system 40 by counting respectively the clock pulses passed by the AND gate 96 and the AND gate 98. Since each pulse passed by the AND gate 96 represents an increment in the index position of the bed 28 of FIG. 1, the digital number provided by the counter 148 represents the index position of the bed 28. Similarly, the digital number provided by the counter 150 in response to pulses passed by the AND gate 98 represents the scan position of the camera 24, this corresponding to the Y position on the CRT 160. The output of the counter 148 is converted by the D/A 152 to an analog voltage representing the magnitude of the count, this analog voltage then being summed by the summer 156 with the X coordinate output of the camera 24 to provide the X axis signal for the CRT 160. Similarly, the output of the counter 150 is converted to an analog voltage by the D/A 154 and summed by the summer 158 with the Y coordinate voltage of the camera 24 to provide the Y axis signal for the CRT 160. The Z axis output of the camera 24 representing the magnitude of received gamma ray signals is coupled to the Z axis of the CRT 160 for modulating the intensity thereof. In this way, the X and Y coordinate signals of the camera 24 which represent the positions of image points of the image viewed by the camera 24 are offset on the CRT 160 in accordance with the position of the camera 24 relative to the subject 26. As the camera 24 scans each leg of the path 46 of FIG. 1, the corresponding portion of the image is created on the CRT 160 with the same amount of graduated overlap as was described previously with reference to the overlap region 48 of FIGS. 1 and 4. A knob 161 is provided for adjusting the scale or size of the image on the CRT 160 to provide an enlarged view of a portion of the subject 26 when it is desired to scan over only a portion of the subject 26. Thus, the resulting image on the CRT 160 of the display system 40 is an image of the subject 26 formed of successive image strips which are blended in the respective overlap regions to provide a smooth transistion from one image strip to the contiguous image strip without the formation of a seam or other discontinuity along their interface.

Figure 7:
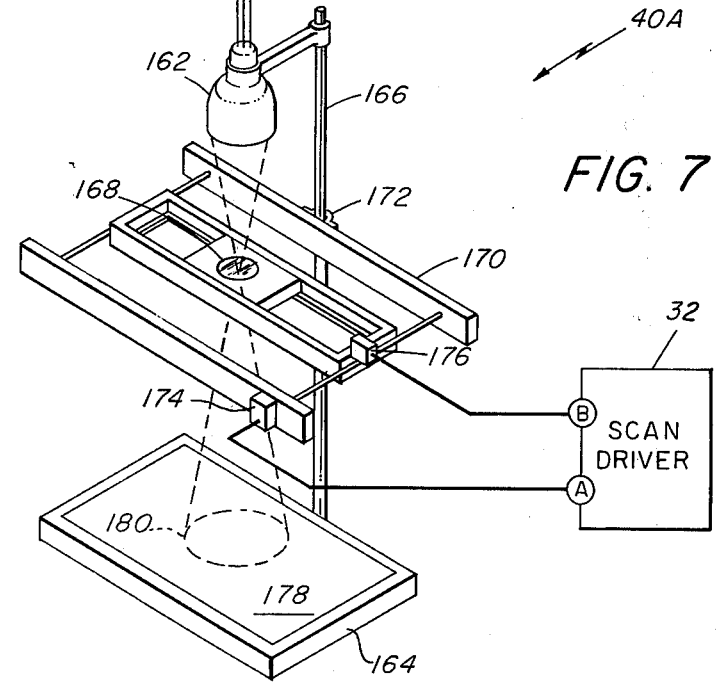
FIG. 7 shows an embodiment of the display system in which a moving lens is positioned between the cathode ray tube and a photographic plate.

Referring now to FIG. 7, there is seen an alternative embodiment of the display system 40 of FIG. 1, this alternative embodiment being identified by the legend 40A. The display system 40A comprises the camera 24, the scan driver 32, an oscilloscope 162 affixed to a base 164 by a frame 166, a lens 168 positioned between the oscilloscope 162 and the base 164 by a lens transport 170 secured to the frame 166 by a clamp 172, and two stepping motors 174 and 176 mounted on the lens transport 170 and energized respectively from terminals A and B of the scan driver 32 for imparting motion to the lens 168. The X, Y and Z terminals of the camera 24 are coupled directly to the corresponding terminals of the oscilloscope 162, rather than via the scan drive 32 as was taught previously with respect to display system 40 of FIG. 6. The Z terminal provides the Z axis modulation for an image appearing on the oscilloscope 162 while the X and Y terminals provide the X and Y coordinate signals to the X and Y terminals of the oscilloscope 162 for positioning each point of the image on the face of the oscilloscope 162. A film plate 178 is positioned on the base 164 and illuminated by rays of light emanating from the oscilloscope 162 and passing through the lens 168 to the film plate 178. The lens 168 focuses the image on the face of the oscilloscope 162 to be projected upon the film plate 178. With reference to FIG. 6, it is noted that terminal A of the scan driver 32 receives the same electric pulses as does the index motor 76 and, accordingly, the motor 174 of FIG. 7, being coupled to terminal A of the scan driver 32, drives the lens 168 with an indexing movement that is synchronous to the indexing movement of the bed 28 of FIG. 1. Similarly, the motor 176 of FIG. 7 is coupled to terminal B of the scan drive 32 as is the scan motor 78 of FIG. 6 so that the motor 176 imparts a scanning movement to the lens 168 which is synchronous to the scanning movement of the bed 28 of FIG. 1.

The image 180 projected onto the film plate 178 by the lens 168 is scanned along the film plate 178 in synchronism with the movement of the lens 168. Accordingly, the position of the image 180 on the film plate corresponds to the position of the camera 24 of FIG. 1 relative to the subject 26. At each position of the camera 24 there is produced a new image at a new position on the film plate 178. Thus, the scanning of the image 180 along the film plate 178 produces a pictorial representation on the film plate 178 which is identical to the picture presented on the face of the CRT 160 of FIG. 6, this being a radiograph of the subject 26 of FIG. 1. The teachings of the overlap region 48 of FIG. 1 and the corresponding overlapping regions in the image on the CRT 160 apply to the picture appearing on the film plate 178. Thus, the radiograph on the film plate 178 is composed of image strips having a graduated overlap at their interface which permits a blending of the images of the successive strips to provide a radiograph of the complete subject 26 without any seams or discontinuities between the contiguous image strips.

Figure 8:
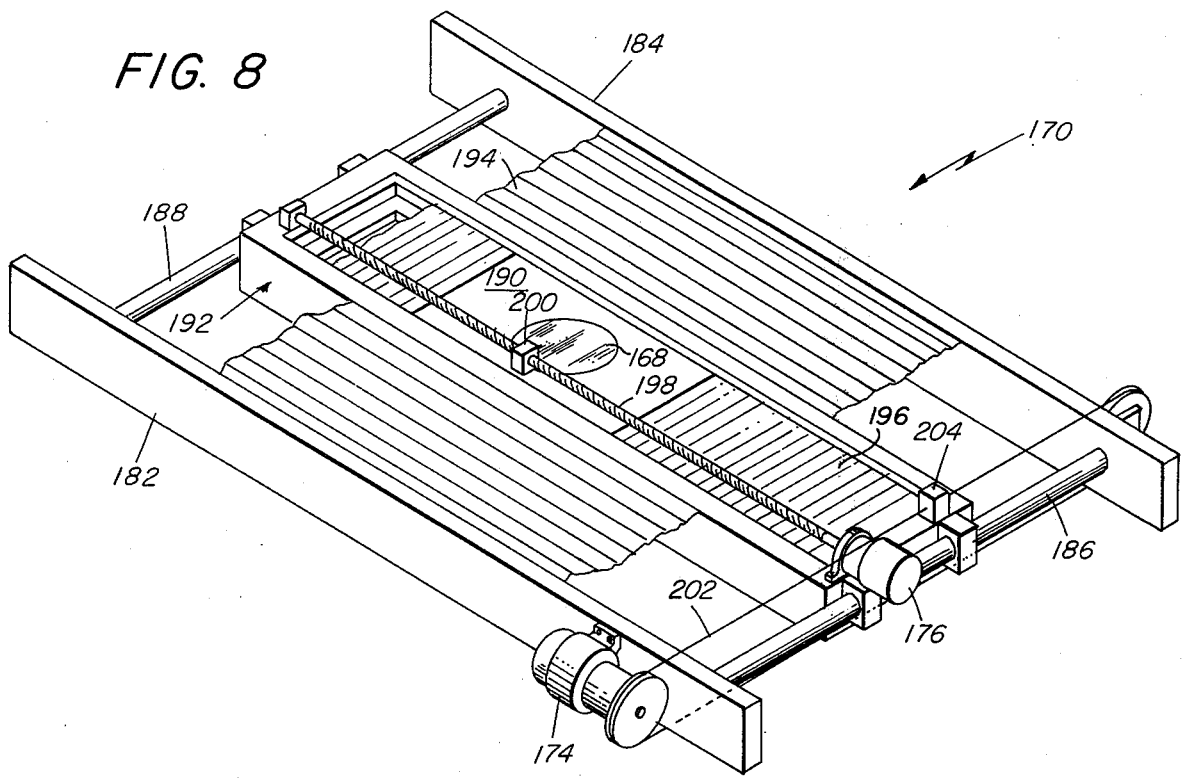
FIG. 8 shows an isometric view of a lens transport of FIG. 7.

Referring now to FIG. 8, there is seen an enlarged isometric view of the film transport 170 which is seen to comprise the motors 174 and 176, the lens 168, two longitudinal frame members 182 and 184 which are secured together by side rails 186 and 188, a slide 190 for supporting the lens 168, a slide housing 192 which slidably supports the slide 190 for motion in the scan direction and is slidably supported on the side rails 186 and 188 for motion in the index direction, and curtains 194 and 196 positioned respectively between the slide housing 192 and the frame members 182 and 184 and between the slide 190 and the slide housing 192 to block the rays of light propagating from the oscilloscope 162 to the film plate 178 of FIG. 7 except for those rays passing through the lens 168. The slide 190 is parallel to the film plate 178. The motor 176 is coupled to the slide 190 by a drive screw 198 and a worm nut 200 so that rotation of the motor imparted to the drive screw 198 induces translational motion of the slide 190 in the scan direction. The motor 174 is coupled to the slide housing 192 by a capstan drive comprising a belt 202 secured by an anchor 204 to the slide housing 192 so that rotation of the motor 174 imparted to the belt 202 induces translation of the slide housing and of the lens 168 in the index direction.

Figure 10:
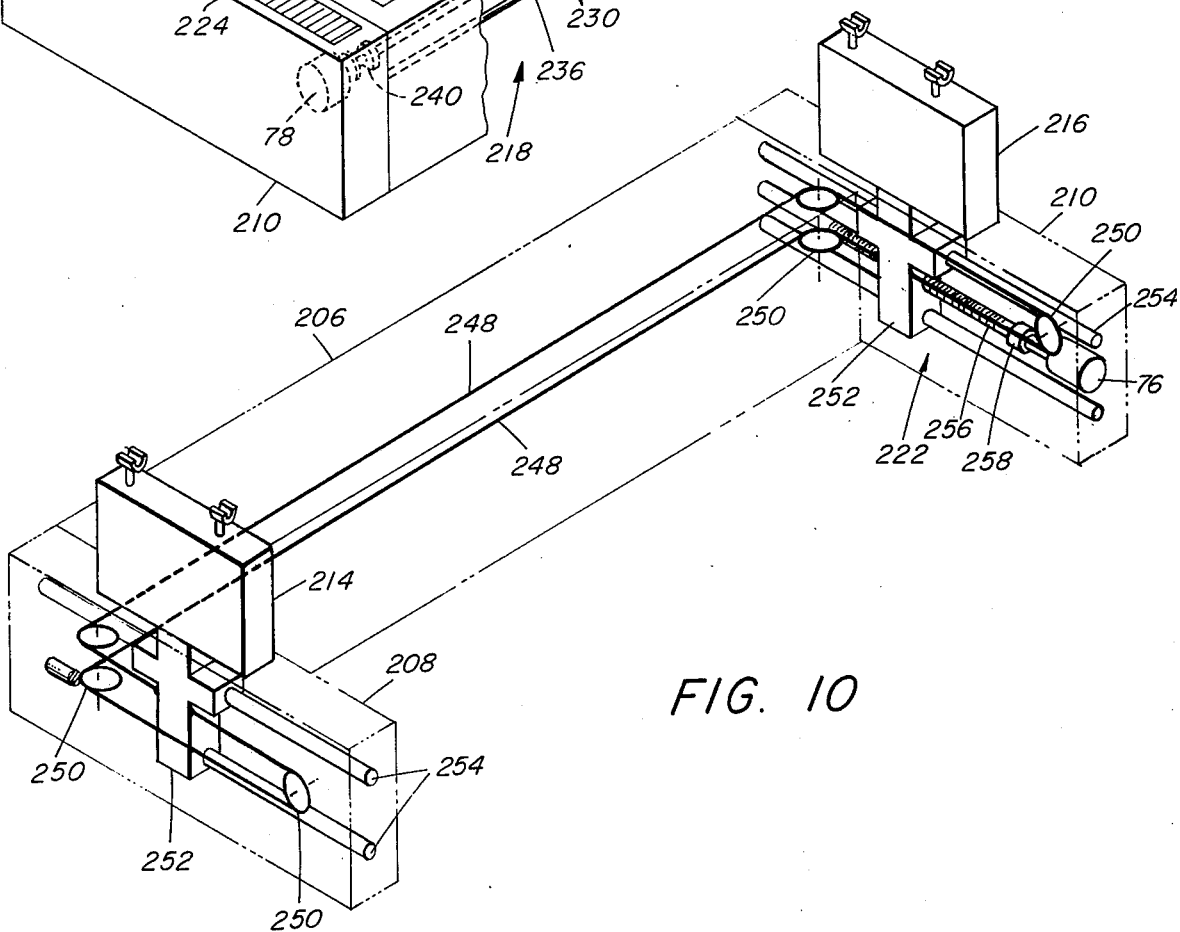
FIG. 10 is an isometric view shown in phantom of the scanner of FIG. 9 with the front portion of the scanner being seen to display the scan indexing mechanism which moves the subject in the index or X direction.

Referring now to FIGS. 9 and 10, there are seen isometric views showing respectively the rear and front sides of the scanner 22 of FIG. 1, FIG. 10 being only a partial view in which the bed 28 and the camera 224 are deleted to better show an indexing mechanism. The scanner 22 comprises a back wall 206, side walls 208 and 210, a post 212, a yoke 213 pivotably connected to the camera 24 and carried by the post 212, pedestals 214 and 216, a longitudinal drive assembly 218 located within the back wall 206 with curtains 220 covering an access port therein, and a transverse drive assembly 222 located within the sidewalls 208 and 210 with cabling passing through the back wall 206, there being curtains 224 covering access ports within the side walls 208 and 210. The vertical drive assembly 226 is shown in phantom drawing within the post 212 of FIG. 9 for raising and lowering the yoke 213, a curtain 228 being seen in FIG. 1 for covering an access port within the post 212. The longitudinal, transverse and vertical drive assemblies respectively 218, 222 and 226 comprise respectively the scan motor 78, the index motor 76 and the camera raising motor 80 of the scan driver 32 shown in FIG. 6.

The longitudinal drive assembly 218 further comprises support rods 230 upon which a base portion 232 of the post 212 is slidably mounted with the aid of recirculating ball roller assemblies 234 (partially seen in FIG. 9), a drive screw 236 coupling the motor 78 to a recirculating ball worm nut 238 (partially seen in FIG. 9) carried by the base portion 232, and a vibration absorbing coupling 240 connected between a shaft of the motor 78 and the drive screw 236 for attenuating vibrations of the stepping action of the motor 78 to promote smooth vibration-free rotation of the drive screw 236. Thus, rotation of the scan motor 78 is transformed via the drive screw 236 and the worm nut 238 to translational motion of the post 212 whereby the camera 24 scans over the subject 26, the subject 26 being partially seen under the covering of a sheet 242 in the bed 28.

The yoke 213 is provided with a motor, not seen in FIG. 9, for pivoting the camera about pivot 244 and a second motor, not seen in FIG. 9, for pivoting the yoke 213 relative to a base 246 of the yoke 213 about the access of the yoke 213 to permit observation of the subject 26 from various angles. Also, as will be disclosed hereinafter, the pedestals 214 and 216 contain means for raising the bed 28 so that the camera 24 can be lowered beneath the bed 28 and tilted upwardly to photograph the subject 26 from underneath the bed 28. The tilting of the yoke 213 is also useful in a situation in which the subject 26 is to be photographed in an inclined position such as a situation in which his feet are elevated relative to his head.

The transverse drive assembly 222 utilizes a worm drive with cabling 248 connected via pulleys 250 between the pedestals 214 and 216 to urge them to move together in unison. Each pedestal 214 and 216 is mounted upon a frame 252 which is slidably supported by rods 254 for translating in the index direction in response to urging by a drive screw 256 passing through a worm nut within the frame 252 of the pedestal 216. The drive screw 256 is coupled to the motor 76 by a vibration absorbing coupling 258 which absorbs the vibration of the stepping action of the motor 76 so that the drive screw 256 rotates with a smooth vibration-free motion. The cabling 248 is secured to the lower portion of the frame 252 of the pedestal 216 and to the upper portion of the frame 252 of the pedestal 214 so that a shortening of a length of cable in the side wall 208 is accompanied by a lengthening of the length of cable in the side wall 210, and vice versa. In this way, the two pedestals 214 and 216 are moved in unison in the indexing direction in response to rotation of the index motor 76.

As seen in FIG. 9, the bed 28 has side rails 260 having extensible arms 262 which are coupled together by a rod-like handle 264. The arms 264 are nestedly supported by cradles 266 secured within the pedestals 214 and 216. In this way, the pedestals support the bed 28 and the transverse motion of the pedestals 214 and 216 is transferred to the bed 28.

Figure 11:
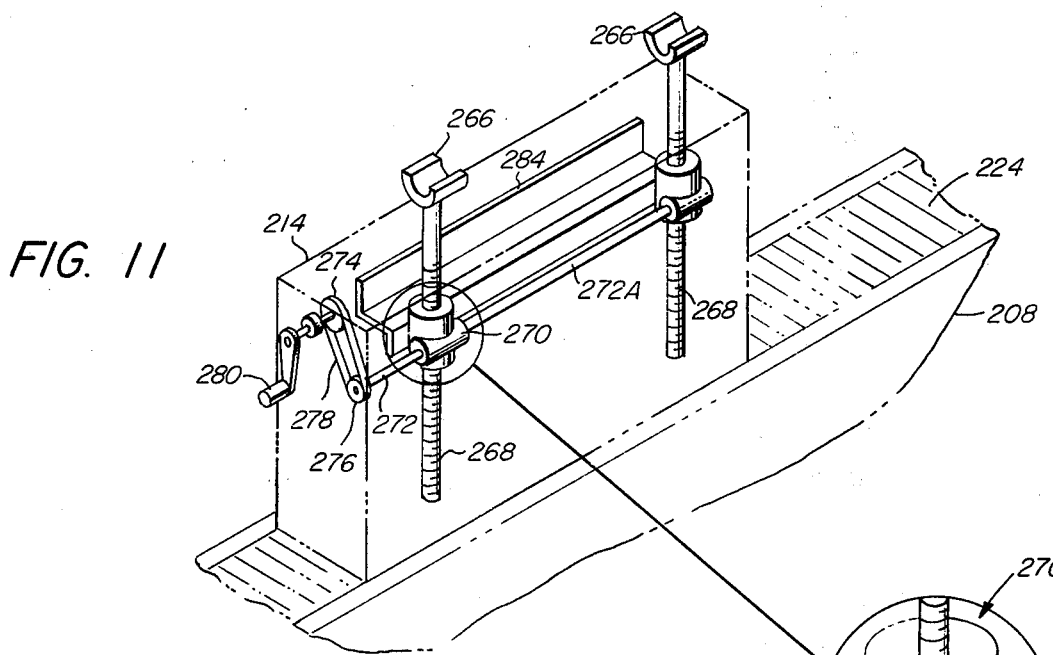
FIG. 11 shows an isometric view of a pedestal positioned at one end of the scanner of FIG. 9, the pedestal being utilized for raising and lowering one end of a bed which supports the subject.

Referring now to FIG. 11, there is seen an enlarged view of the pedestal 214. The following descriptive comments relating to the pedestal 214 relate equally well to the pedestal 216; accordingly, only the pedestal 214 will be described.

Figure 12:
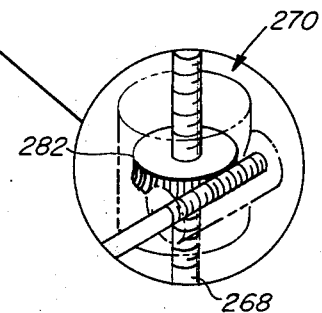
FIG. 12 is a detailed view of a jack of FIG. 11 utilized in raising the bed.

The cradles 266 are secured into the pedestal 214 by threaded shafts 268. The threaded shafts 268 are raised or lowered by jacks 270, better seen in the enlarged view of FIG. 12, which are driven by a rod 272 coupled by pulleys 274 and 276 and belt 278 to a hand crank 280. The rod 272 is coupled via a worm gear 282 to the shafts 268 for imparting translational motion thereto along its axis. The worm gear 282 is threaded along the inner surface which mates with the outer surface of the shaft 268 so that as the worm gear 282 rotates without rotation of the shaft 268, the threading of the worm gear 282 urges the shaft 268 to travel along its axis. An extension of the rod 272 indicated by the legend 272A couples the two jacks 268 together so that they operate in unison in response to rotation of the hand crank 280. The belt 278 is preferably of the form known as a timing belt having teeth along its inner surface which engage similar teeth on the two pulleys 274 and 276 to ensure that the pulleys rotate without slippage. The jacks 268 are supported by a bracket 284 secured to the pedestal 214.

Referring also to FIGS. 6 and 9, it is seen that the camera raising motor 80 may be operated in synchronism with the scan motor 78 to provide a plane of scan which is tilted in accordance with a tilting of the bed 28 by the pedestals 214 and 216. Activation of the camera raising motor 80 permits the camera 24 to maintain a fixed distance from the subject 26 as the camera 24 is scanned back and forth along the successive legs of the path 46. In the case where the subject's head is elevated a relatively small amount relative to his feet, it is apparent that a relatively small amount of rotation of the motor 80 suffices to maintain the constant distance between the camera 24 and the subject 26. On the other hand, when the subject's head is elevated a larger amount a larger amount of rotation of the motor 80 is required to maintain a constant distance between the camera 24 and the subject 26 during the scanning. In order to provide the desired amount of rotation of the motor 80, the scaler 142 scales the number of incoming pulses from line 134 so that a proportionately smaller number of pulses appears on line 146, the scale factor being for example 8, 12, 16, or such other number as may be set in by the operator of the scanner 22 by turning the knob 144. The scaler 142 comprises well-known digital counting circuitry. In the event that the motor 80 is to remain motionless during the scanning, the switch 138 is operated to couple the motor 80 to the manual control 140. The manual control 140 includes an oscillator which provides pulses suitable for the energization of the motor 80 so that the manual control 140 can raise, lower or maintain the position of the camera 24 at the will of the operator of the scanner 22.

Figure 13:
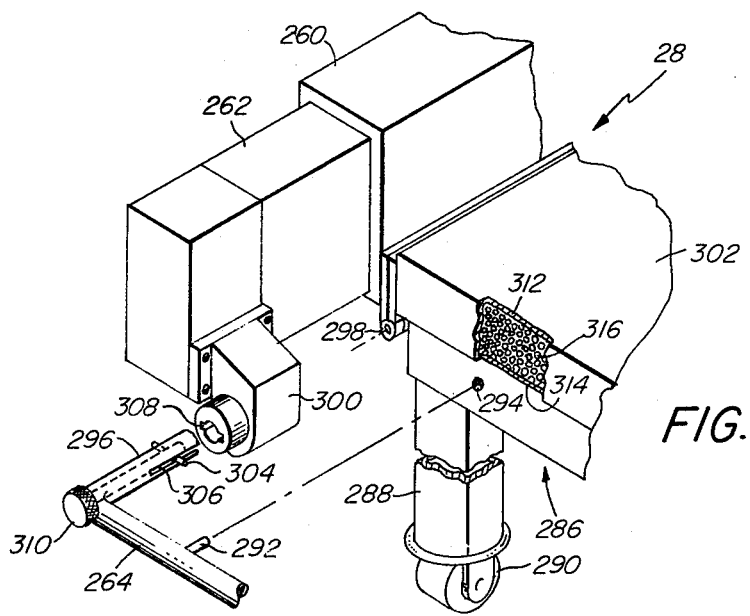
FIG. 13 shows a partial view of the bed of FIG. 9 disclosing a fold-down mechanism for the sides of the bed as well as a pin for locking the bed to a cart used in transporting the bed to the scanner.

Referring now to FIG. 13, there is seen a partial view of a corner of the bed 28 of FIG. 9, the bed 28 being carried by a cart 286 preparatory to being mounted on the pedestals 214 and 216 of the scanner 22. The cart 286 is of a form customarily used in hospitals for transporting patients and, as seen in the figure, comprises a leg 288 and castored wheel 290. In addition, in accordance with one aspect of the invention, the handle 264 of the bed 28 which, as was taught here and above with reference to FIG. 11, is adapted to be secured within the cradles 266 of the pedestals 214 and 216, is further provided with a pin 292 positioned for entry within a hole 294 in the cart 286 adjacent the leg 288 thereof upon retraction of the extensible arms 262 of the bed 28 into the side rails 260 thereof. The securing of the pin 292 within the hole 294 locks the bed 28 onto the cart 286 to ensure safe transport of the patient in the bed 28 upon the cart 286.

A further feature of the invention is provided by the end fitting 296 of the arm 264 which is positioned coaxially to the axis of a hinge 298 by means of a housing 300 which secures the handle 264 to the extensible arm 262. The hinge 298 pivotally secures the side rail 260 to a transverse supporting member 302 of the bed 28. The hinge 298 permits the side rail 260 to be raised for securing the patient on the bed 28 or lowered to permit the patient to be transferred from the bed 28 to, for example, a surgical table.

The end fitting 296 is provided with a transverse pin 304 slidably mounted within a slot 306 of the end fitting 296, the pin 304 mating with a key way 308 within the housing 300 for securing the side rail 260 from pivoting about the hinge 298 when the bed 28 is being transported by the cart 286 and, also, during a scanning operation by the scanner 22. When it is desired to lower or raise the side 260, a knob 310 is pulled outwardly from the end fitting 296 to extract the pin from the key way 308, thereby permitting the housing 300 and the side rail 260 to pivot about the common axis of the end fitting 296 and the hinge 298. Additional key ways such as the key way 308 may be located within the housing 300 to secure the side rail 260 in a number of orientations about the axis of the hinge 298.

The transverse supporting member 302 of the bed 28, as may be seen in the partially cutaway view of the member 302, comprises an upper and lower aluminum sheet 312 and 314 which are secured in spaced apart relation by a rigid cellular material 316 such as solid foamed polyurethane. The upper and lower sheets 312 and 314 in cooperation with the cellular material 316 form a rigid strong laminate which is transparent to gamma radiation. This transparency permits the aforementioned scanning of the subject 26 of FIGS. 1 and 9 with the camera 24 positioned beneath the bed 28 and looking up at the subject 26.

Figure 14:
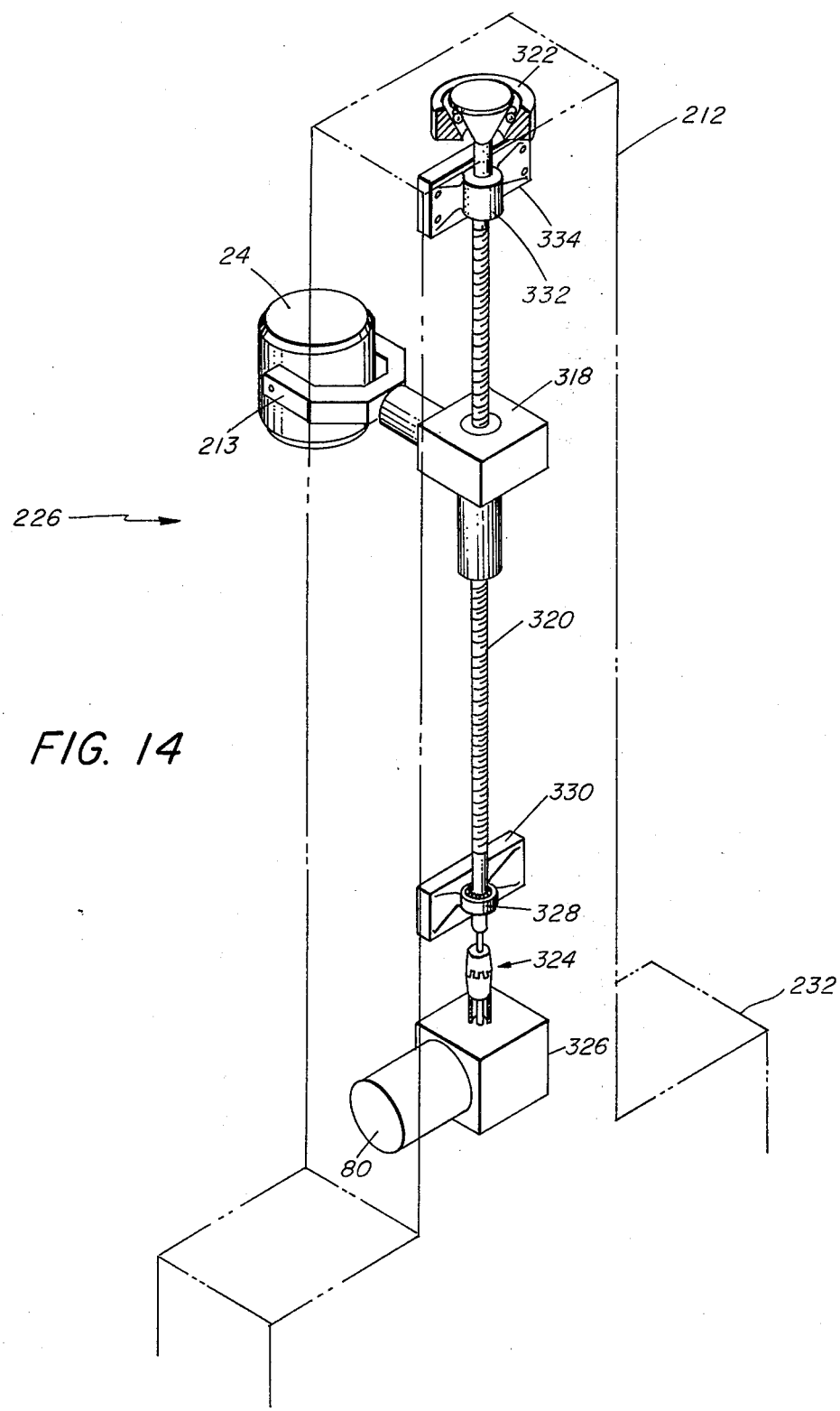
FIG. 14 shows a drive mechanism for raising and lowering the camera of FIG. 9.

Referring now to FIG. 14, there is seen an isometric view of the vertical drive assembly 226, previously shown in phantom view in FIG. 9. The drive assembly 226 is secured within the post 212, shown here in phantom view, and is shown supporting the camera 24 and yoke 213 by means of an enlarged recirculating ball worm nut 318 which rides up and down a drive screw 320 in response to rotation imparted thereto by the camera raising motor 80. The drive screw 320 is secured at its upper terminuous by a conically surfaced bearing 322 and, at its lower end, is coupled via a vibration absorbing coupling 324 to a gear box 326 secured to the motor 80. The lower end of the drive screw 320 is secured by a bearing 328 mounted on a supporting bracket 330 which is secured to the post 212. A safety clutch 332 encloses an upper portion of the drive screw 320, the clutch 332 being supported by a bracket 334 which is secured to the post 212. Th clutch 332 comprises a spring actuated friction member enclosing an inner drum of the clutch 332 (not shown in the figure), the spring being tightened when the drive screw 320 revolves in a direction to lower the camera 24, the spring being loosened to reduce friction of the inner drum when the drive screw 320 is being rotated in a direction to raise the camera 24. The friction induced by the clutch 332 during a lowering of the camera 24 is sufficient to overcome the torque induced on the drive screw 320 by the worm nut 318 due to the force of gravity on the camera 24. In this way, in the event that the coupling 324 were to fracture, no harm would occur to the subject 26 of FIG. 1 since the safety clutch 332 would prevent the drive screw 330 from rotating and thereby prevent the camera 24 from dropping on the subject 26.

Figure 15:
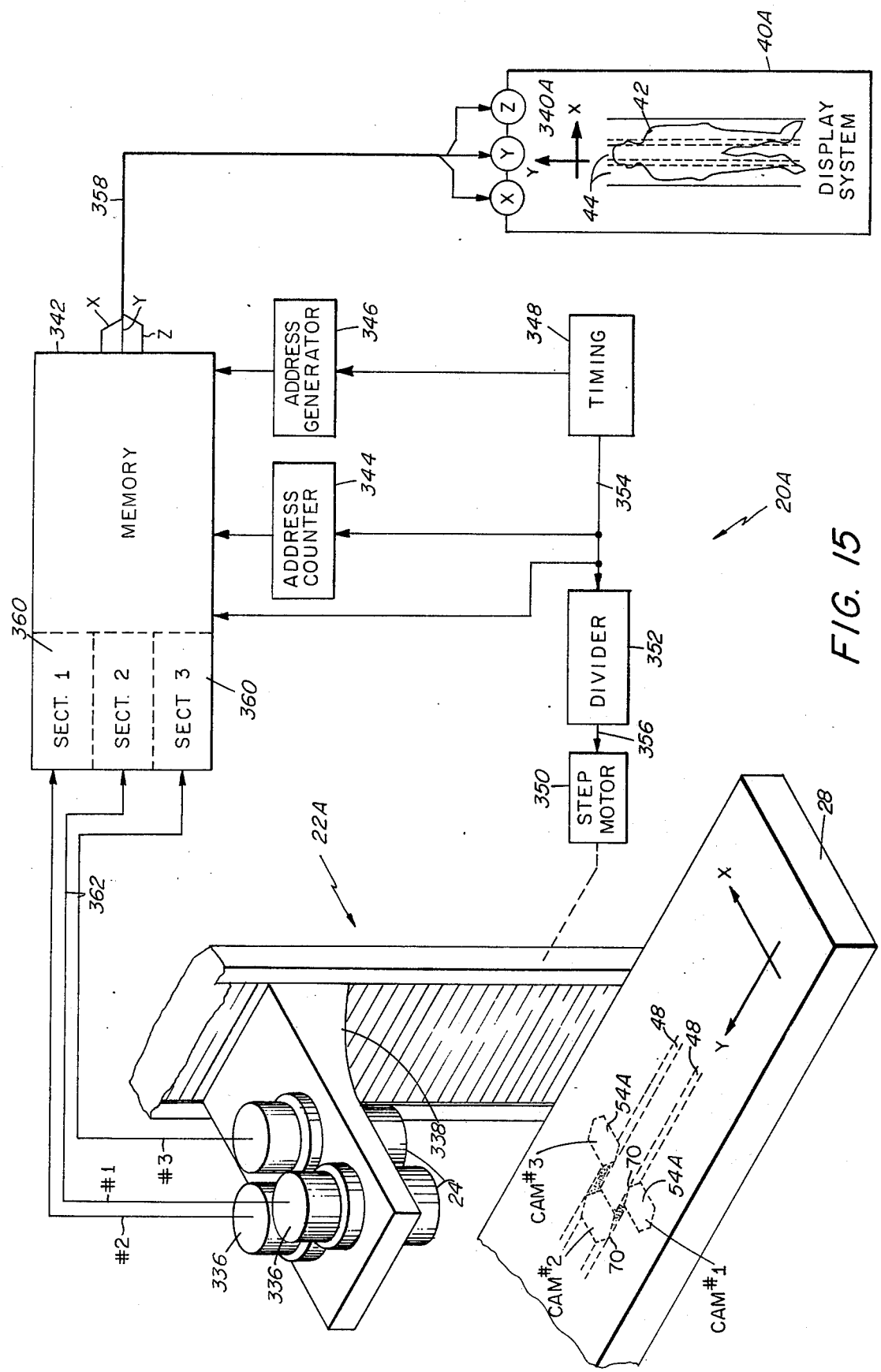
FIG. 15 is a diagram of an alternative embodiment of the scanning camera system of FIG. 1, this alternative embodiment utilizing three cameras mounted side-by-side for simultaneously providing scans along each of the legs of a scan path of FIG. 1.

Referring now to FIG. 15, there is seen a diagram of an alternative embodiment of the system 20 of FIG. 1, this system being identified by the lengend 20A and having a set of three radiation detectors 336 mounted on a supporting bracket 338 which is carried by the scanner 22 in a manner analogous to that of the yoke 213 of FIG. 1. Each of the radiation detectors 336 is constructed in a manner analogous to the camera 24 of FIG. 1 and includes the mask 52 having the aperture 54 with the projections 54A thereof being shown on the bed 28 in FIG. 15. Each detector 336 provides an image of a portion of the subject 26 of FIG. 1, the particular portions being image at any one instant of time being designated by the aperture projections 54A which are further identified in FIG. 15 by the legends CAM 1-3 corresponding to each of the correspondingly numbered cameras or radiation detectors 336.

The scanner 22 makes a single pass in the direction of the Y axis of the coordinate system 340, the Y axis being parallel to the long dimension of the bed 28. The scanning format provided by the scanner 22 in FIG. 15 is simpler than the scanning format previously described with reference to FIG. 1. It is recalled that at the conclusion of a scanning of each leg of the path 46 of FIG. 1, the scanner 22 indexed the camera 24 in a direction transverse to the leg to initiate a scanning movement along the next leg of the path 46. However, in the scanning format of FIG. 15, all the data for providing an image of the subject 26 has been obtained by the time the first detector 336 has completed a pass along one leg, this corresponding to leg No. 1 of FIG. 1, of the scan since the second and third detectors 336 have simultaneously completed scannings along legs of the scan corresponding to leg No. 2 and leg No. 3 of FIG. 1.

The three detectors 336 are positioned side-by-side in a direction transverse to the Y axis with the second detector 336 being positioned slightly ahead of the first and third detectors 336 to permit their being nested in a configuration which permits the apexes 70 of the aperture projections 54A to overlap in the manner taught previously with reference to FIGS. 1 and 4. In this way, there is provided the same graduated overlapping of image portions of the image 42 for each of the scan paths 44 of the display system 40A in FIG. 15 as was previously described with reference to the display system 40 of FIG. 1. In FIG. 15, a coordinate system 340A is shown in the display system 40A to identify the X and Y directions of the display system 40A which correspond to the X and Y directions of the bed 28.

The system 20A of FIG. 15 is seen to comprise a memory 342, a counter 344, an address generator 346, a timing unit 348, a stepping motor 350, and a divider 352 which couples the stepping motor 350 to the timing unit 348. The timing unit 348 provides clock pulses on line 354 for clocking signals from the three detectors 336 respectively into sections 1, 2 and 3 of the memory 342, the clock pulses 354 being applied to the divider 352 which divides the repetition frequency of the clock pulses on line 354 by an integer to produce a set of pulses on line 356 of a lower repetition frequency for driving the stepping motor 350 at a rate proportional to the repetition frequency of the clock pulses on line 354. The stepping motor 350 drives the detectors 336 along the Y axis for scanning a subject supported by the bed 28. The counter 344 counts the clock pulses on line 354 to provide a count which is proportional to the amount of rotation of the rotor of the stepping motor 350 and, accordingly, proportional to the distance traveled by the detectors 336 along the Y axis during a scan by the scanner 22. In this way, the counter 344 enters an address into the memory 342 for the signals of the three detectors 336 designating the positions of the points of emanation of radiant energy from the subject 26 of FIG. 1, these positions being referenced relative to the coordinate axis 340.

While the data for forming the image on the display system 40A is gathered simultaneously by each of the three detectors 336, the memory 342 permits this data to be transmitted sequentially to the display system 40A. The data includes X, Y and Z components transmitted via cable 358 from the memory 342 to X, Y and Z Z terminals of the display system 40A. The X and Y data represents the position of each detector 336 plus the position of image points relative to each detector 336. The Z data represents the magnitudes of energies incident upon the detectors 336. In the event that the data is to be made available during the actual scanning operation, then the memory 342 may comprise sets of shift registers, one set being in each section 360 of the memory 342 for storing X, Y and Z data transmitted along lines 362 from the detectors 336. The sets of shift registers are then sequentially addressed by the address generator 346 in response to timing signals from the timing unit 348 to provide points of the image for each of the scan paths 44 on the display system 40A. In the event that the image on the display system 40A is to be provided subsequently to the completion of a scan by the scanner 22A, then greater memory capacity is required for the memory 342, in which case the memory 342 may include magnetic tape or other storage media.

It is understood that the above-described embodiment of the invention is illustrative only and that modifications thereof may occur to those skilled in the art. Accordingly, it is desired that this invention is not to be limited to the embodiment disclosed herein but is to be limited only as defined by the appended claims.

What is claimed is:

1. A radiographic imaging system comprising:
   a camera positioned to face a radiating subject, said camera producing electrical impulses in response to quanta of radiation;
   means coupled to said camera for inducing a relative motion between said subject and said camera, said relative motion following a prescribed scan format having one portion of said format partially overlapping a second portion of said format; and means coupled to said camera for gradually tapering the amount of said electrical impulses provided by said camera for radiation received along the overlapping region between said one portion and said second portion of said scan format.

2. A system according to claim 1 wherein said tapering means comprises a collimator means for restricting the amount of radiant energy received along a side of its aperture.

3. A system according to claim 2 wherein said collimator means comprises a collimator and a mask secured to a front face thereof, said mask restricting the amount of radiation received along a side of an aperture of said mask.

4. A system according to claim 3 wherein said mask has an aperture bounded by six sides, one pair of said sides being parallel, a third side and a fourth side thereof being angled with respect to each other and joining said first two sides.

5. A system according to claim 3 wherein said mask has an aperture bounded by first and second sides which are parallel to each other, and third and fourth sides positioned opposite each other and joining together said first and said second sides, said third side and said fourth side being bowed along said interface between portions of said scan format to provide a blending of an image taken by said camera during said one portion of said scan format with an image taken by said camera during said second portion of said scan format.

6. A system according to claim 3 wherein said mask has an aperture bounded by a parallelogram having an acute angle between one pair of sides thereof for gradually tapering the amount of said electrical pulses provided by said camera for radiation received along said interface between portions of said scan format.

7. A system according to claim 2 in which said collimator means comprises a collimator having holes transparent to said radiation, said holes being arranged to provide said tapering in a direction normal to said interface, and means coupled to said camera and to said relative motion means for positioning said collimator to provide said tapering normal to said interface.

8. A system according to claim 7 wherein said scan format has a longitudinal portion and a transverse portion, said relative motion means including a longitudinal drive means and a transverse drive means for providing respectively relative motions in said longitudinal portion and said transverse portion of said scan format.

9. A system according to claim 8 wherein said longitudinal drive means is coupled to said camera for driving said camera in a longitudinal direction relative to said subject.

10. A system according to claim 9 wherein said relative motion means includes a bed for supporting said subject, said transverse drive means being coupled to said bed for moving said subject in a transverse direction relative to said camera.

11. A system according to claim 10 wherein said relative motion means includes means for raising one end of said bed relative to the opposite end of said bed, said relative motion means further including means for tilting said camera to face said subject.

12. A system according to claim 8 wherein said relative motion means includes means for supporting said subject, said supporting means including means for inclining said subject, said relative motion means further including means for raising and lowering said camera during said relative motion in said scan format in accordance with the inclination of said subject.

13. A system according to claim 8 wherein said transverse drive means includes means for adjusting an overlap of electrical pulses provided by said camera for radiation received along said one portion and said second portion of said scan format.

14. A system according to claim 1 wherein said relative motion means comprises longitudinal and transverse drive means, said transverse drive means including means for adjusting the overlap of an image provided by said camera therein said one portion and said second portion of said scan format.

15. A system according to claim 14 wherein said relative motion means further comprises means for supporting said subject and means for inclining said subject relative to the horizontal plane.

16. A system according to claim 1 wherein said relative motion means includes means for adjusting the amount of overlap between images provided by said camera in said one portion and said second portion of said scan format for said gradually tapering the amount of said electrical pulses along said interface.

17. A system according to claim 16 wherein said overlap adjusting means alters the spacing between said one portion and said second portion of said scan format.

18. A system according to claim 1 wherein said relative motion means comprises means for orienting said scan format in a plane inclined to the horizontal.

19. A system according to claim 18 wherein said orienting means comprises means for elevating and lowering said camera during a scanning by said relative motion means.

20. A system according to claim 1 further comprising an oscilloscope having an X axis terminal and a Y axis terminal for positioning the position of an image on the face thereof, said oscilloscope having a Z axis terminal for modulating the intensity of points of said image, said Z axis terminal being coupled to a Z axis terminal of said camera, said X axis and said Y axis being coupled by summing means to corresponding X and Y terminals of said camera, said summing means being coupled to said relative motion means for summing position signals to X and Y signals provided by said camera to offset an image displayed on said oscilloscope in accordance with the relative position of said camera and said subject.

21. A system according to claim 1 further comprising an oscilloscope spaced apart from a photographic film plane, a focusing system positioned between said oscilloscope and said film plane to provide a projection of an image from said oscilloscope upon said film plane, said focusing including means synchronized with said relative motion means for moving said projection in synchronism with the relative motion of said camera relative to said subject.

22. A radiographic imaging system comprising:
means for forming an image of a subject emitting radiation;
means for imparting a relative motion between said imaging means and said subject to provide a scanning along a first path and a scanning along a second path contiguous to said first path, said imaging means forming an image of a first portion of said subject scanned by said first path and an image of a second portion of said subject scanner by said second path; and means for blending said image of said first portion and said image of said second portion along an interface therebetween, said blending means including means for adjusting the spacing between center lines of said first path and said second path and means for tapering the imaging energy received along said first path and said second path at the interface thereof.

23. A system according to claim 22 wherein said spacing adjusting means includes a bed for supporting said subject, means for moving said bed in a transverse direction, and means for elevating said bed to disengage it from a transport thereof.

24. A radiographic scanning system comprising:
a camera for forming an image of a subject emitting radiant energy;
means for supporting said subject, said supporting means including means for inclining said subject;
means for orienting said camera to face said subject; and
means for imparting a relative motion between said orienting means and said supporting means along a first scanning path in a first plane, said orienting means including means for displacing said camera relative to said first plane during said motion to provide a relative motion between said camera and said subject along a second scanning path in a second plane inclined to said first plane.

25. A system according to claim 24 wherein said second plane is parallel to said subject.

26. A system according to claim 25 wherein said first scanning path comprises longitudinal and transverse path sections.

27. A system according to claim 26 wherein said motion means includes means for moving said supporting means in a transverse direction to produce said transverse path section.

28. A system according to claim 27 wherein said motion means includes means for moving said orienting means in a longitudinal direction to produce said longitudinal path section.

29. A radiographic imaging system comprising:
a plurality of radiation detecting means oriented to face a subject emitting radiation for scanning said subject in a prescribed scan format, said radiation detection means being positioned side-by-side in a direction transverse to a path of said scan format, each of said detecting means producing electrical impulses in response to radiation incident thereupon;
means coupled to each of said detecting means for inducing a relative motion between said subject and each of said detecting means, said relative motion following said prescribed scan format, one portion of said scan format being contiguous to a second portion of said scan format; and
means coupled to each of said detecting means for gradually tapering the amount of said electrical impulses provided by each of said detecting means for radiant energy received along an interface between said one portion and said second portion of said scan format.

30. A system according to claim 29 further comprising display means providing an image of said subject and a memory means coupled between said display means and said detection means for storing signals corresponding to said electrical impulses.

31. A system according to claim 30 further comprising means coupled to said memory means for entering into said memory means the location data of points of emanation of said radiant energy from said subject corresponding to individual ones of said electrical impulses, said location data being coupled to said display means for locating points of said image on said display means.

* * * * *

UNITED STATES PATENT OFFICE
CERTIFICATE OF CORRECTION

Patent No. 4,012,636      Dated March 15, 1977

Inventor(s) Lawrence W. Engdahl, John F. Batter, Jr. and Karl J. Stout

It is certified that error appears in the above-identified patent and that said Letters Patent are hereby corrected as shown below:

Patent Title should read SCANNING GAMMA CAMERA WITH TAPERED APERTURE;
Column 6, line 49: change "which" to -- with --;
           line 51: change "time" to -- timer --;
Column 9, line 21: after "plate" insert -- 178 --;
Column 13, line 5: change "th" to -- the --; and
           line 34: change "image" to -- imaged --.

Signed and Sealed this

Twenty-fifth Day of October 1977

[SEAL]

Attest:

RUTH C. MASON
*Attesting Officer*

LUTRELLE F. PARKER
*Acting Commissioner of Patents and Trademarks*